Patented Oct. 16, 1928.

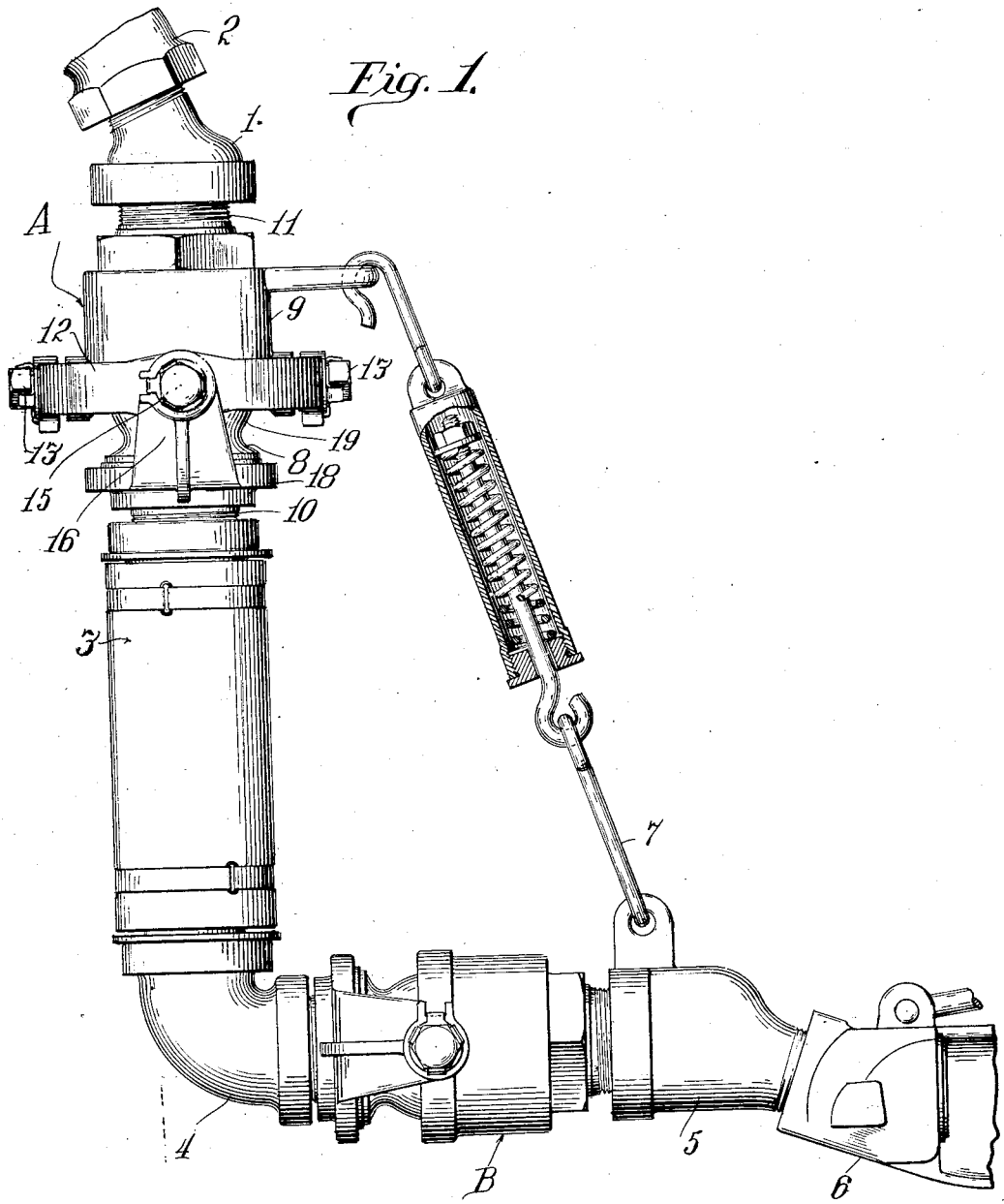

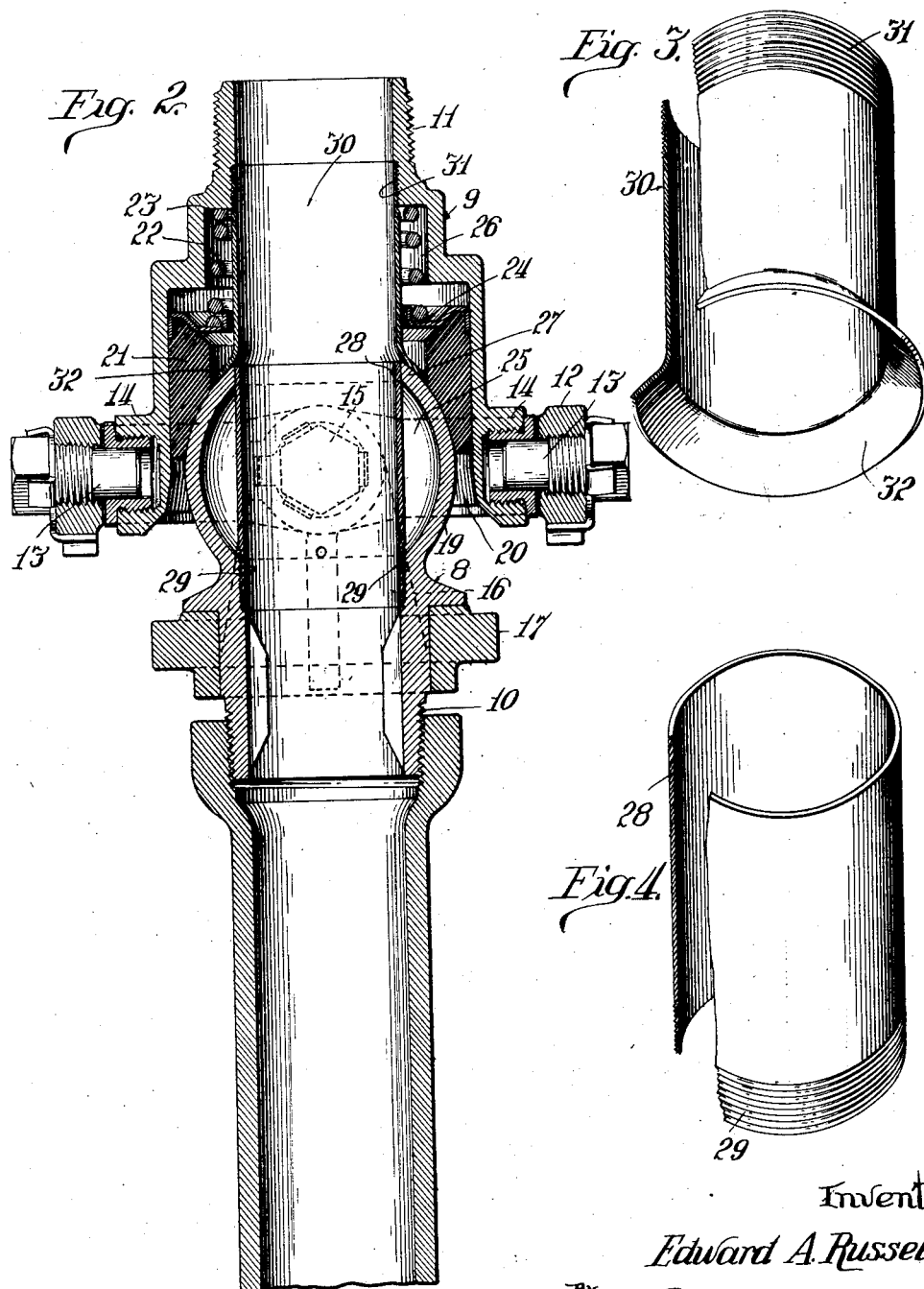

1,687,796

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

FLEXIBLE PIPE JOINT.

Application filed March 10, 1927. Serial No. 174,203.

This invention relates to certain new and useful improvements in flexible joints, particularly adapted for use in a conduit or tubular structure consisting of metal elements flexibly articulated so as to form a fluid tight connection between the train pipes of the adjacent cars of a railway train. The particular improvement consists in so forming the flexible joints that each is provided with an inner fluid passage of substantially uniform and unbroken cross section, so that a substantially uniform and continuous steam passage is formed through the joint and the pipes connected thereby.

Each conduit consists in general, of a vertically disposed conduit member, which is suspended from the end of the car train pipe, and a horizontally disposed conduit member supported at one end from the lower end of the vertically disposed conduit member, and carrying at its free end the coupler for engaging the corresponding coupler on the conduit of the adjacent car. Suitable flexible connections are employed to support the vertically disposed conduit member from the car, and the horizontally disposed conduit member from the vertical conduit member, so that the requisite flexibility is provided to permit the engagement or disengagement of the couplers, and to allow the articulated members a range of movements necessary in order that the connection may accommodate itself to the movements of the car with respect to the adjacent car when the train rounds curves or passes over inequalities in the track.

Preferably and usually the flexible joints used are of the ball and socket type, and due to the irregular internal form of the ball and socket members, and the sealing means employed therebetween, numerous pockets or projections have remained along the walls of the steam passage through the flexible joint. These tend to form eddy currents, and otherwise impede the free flow of the steam, and the particular object of this invention is to so form the members of the flexible joint as to eliminate these pockets and provide a smooth and uniform steam passage through the joint.

Other objects and advantages of this invention will be more apparent from the following detailed description of a certain approved form of apparatus involving the principles of this invention.

In the accompanying drawings:

Fig. 1 is an elevation of one of the flexible conduit assemblies, showing the manner in which the improved flexible joints are used.

Fig. 2 is a vertical central section through one approved form of flexible joint.

Fig. 3 is a perspective view, partially broken away, of the sleeve member used in the socket member shown in Fig. 2.

Fig. 4 is a view similar to Fig. 3 of the sleeve member used in the ball member of Fig. 2.

Referring first to Fig. 1, which shows one of the two identical conduit structures used to connect the train pipes of adjacent cars, A and B indicate the two flexible joints. The socket member of joint A is supported in a vertical position by means of the adapter 1 from the end of the train pipe 2 on the car. The ball member of joint A supports the vertically extending pipe section 3 which has an elbow 4 connecting with one member of the flexible joint B. The other member of flexible joint B connects with the pipe section 5 leading to the coupler member 6 of well known construction, adapted to mate with a corresponding coupler on the flexible conduit of the adjacent car. The flexible connection 7 is adapted to support the horizontal portion of the conduit when disconnected from the adjacent car. The flexible joints A and B may be, and preferably are, of similar construction, and if desired the coupler B may be positioned vertically above the elbow 4 instead of in the horizontal position shown. It is desirable that the steam passage leading from the train pipe 2 of one car through the joined flexible conduits to the corresponding train pipe of the adjacent car be as open and uninterrupted as possible so as not to impede the free flow of the steam, and as a step toward this end the improved flexible joints hereinafter described in detail and claimed have been devised.

Referring now also to Figs. 2, 3 and 4, which show one approved form of the joint, 8 and 9 indicate the ball and socket members respectively of the joint, these members being threaded at their free ends 10 and 11 to connect with the adjacent pipe sections. An articulating ring 12 is pivoted at diametrically opposite points by means of studs 13 to the large open end portion 14 of socket member 9, and similar studs 15 (see Fig. 1) positioned at 90° from the studs 13, pivotally connect ring 12 with diametrically opposite arms 16 projecting upwardly from ring 17 which is swiveled about the ball member 8 behind the projecting flange or shoulder 18. The articulating mechanism just described serves to support the globular portion 19 of the ball member 9 in centered position within the cylindrical opening 20 in socket member 9, but permits a limited rotation or oscillation of the ball member in any direction about its own center. A gasket 21 of rubber composition or other suitable packing material is slidable within the housing 20 of the socket member to seal the joint between the socket member and the inner end of the globular member 19 of the ball member. An expansion spring 22 confined between a shoulder 23 of socket 9 and a follower 24 at the rear end of gasket 21 serves to force the gasket yieldably into the annular space between the ball and socket members to seal the joint at all times, and to take up wear of the gasket.

Flexible joints of the type just briefly described have been found very efficient for connecting the pipe sections of the flexible conduit construction, since they maintain a steam tight joint while permitting the necessary flexibility, and at the same time a free steam passage is permitted through the joint since all of the articulating mechanism is located exteriorly of the steam passage. However, as heretofore constructed, the walls of the steam passage through the joint have been rough and uneven due to the pocket 25 formed within the hollow globular member 19, the pocket or housing 26 in socket 9 which accommodates the spring 22, follower 24 and gasket 21, and to the uneven projections presented by the spring follower, and the free edge 27 of the globular member 19. The resistance offered by these projections, and the eddy currents set up in the pockets act to impede the passage of steam through the joint, and to decrease the efficiency of the steam conduit.

According to this invention, a tubular sleeve 28 has been added within the ball member 8. This sleeve 28 may be threaded at one end as at 29 to engage a correspondingly threaded portion within the neck of the ball member, and the other open end of sleeve 28 is of a size to fit snugly within the open end 27 of the globular ball member 19. A similar sleeve member 30 is threaded at 31 to engage within the neck portion of socket member 9. The other end of sleeve 30 is flared outwardly at 32 to engage the outer surface of the end portion 27 of the globular member 19. The sleeves 28 and 30 are preferably of the same internal diameter as the neck portions of the ball and socket members, and the pipe sections to which the flexible joint is attached. Consequently, when the joint is in its normal unflexed position, as shown in Fig. 2, a substantially continuous, uniform, and unbroken steam passage is provided through the flexible joint, which forms substantially a continuation of the pipe sections with which it is connected.

I claim:

1. A flexible joint comprising a pair of pipe sections of similar inner diameter, one terminating in an enlarged socket member, the other terminating in a hollow ball member, articulating means for holding the ball member centered within the socket member, means housed within the socket member and engaging the outer spherical surface of the ball member for sealing the joint between the members, a cylindrical sleeve of the same inner diameter as the pipe sections threaded within the first mentioned pipe section and extending into proximity with the open end of the ball, and a similar sleeve threaded within the other pipe section and extending through the ball to its open end, whereby when the sections are in alignment a continuous unbroken passage of constant diameter is formed through the joint.

2. A flexible joint comprising a pair of pipe sections of similar inner diameter, one terminating in an enlarged socket member, the other terminating in a hollow ball member, articulating means for holding the ball member centered within the socket member, an annular gasket housed within the socket member, spring means for forcing the gasket into engagement with the outer spherical surface of the ball to seal the joint between the members, a cylindrical sleeve of the same inner diameter as the pipe sections secured within the first mentioned pipe section and extending into proximity to the open end of the ball and then flared outwardly along the outer surface of the ball toward the gasket whereby the gasket and spring means are completely housed between the socket and sleeve in all positions of the ball member, and a second similar sleeve secured within the other pipe section and extending through the ball to its open end, whereby when the sections are in alignment a continuous unbroken passage of constant diameter is formed through the joint.

3. A flexible joint comprising a pair of pipe sections of similar inner diameter, one terminating in an enlarged socket member, the other terminating in a hollow ball member, articulating means for holding the ball member centered within the socket member, means housed within the socket member and engaging the outer spherical surface of the ball member for sealing the joint between the members, a cylindrical sheet metal sleeve of the same inner diameter as the pipe sections secured within the first mentioned pipe section and extending into proximity with the open end of the ball, and a similar sheet metal sleeve of equal diameter secured within the other pipe section and extending through the ball to its open end, whereby when the sections are in alignment a continuous unbroken passage of constant diameter is formed through the joint.

EDWARD A. RUSSELL.